United States Patent [19]

Boucher

[11] 4,110,567

[45] Aug. 29, 1978

[54] MULTI-FREQUENCY GENERATOR USING DIGITAL TECHNIQUE

[75] Inventor: Donald Joseph Boucher, Guelph, Canada

[73] Assignee: International Standard Electric Corporation, New York, N.Y.

[21] Appl. No.: 777,040

[22] Filed: Mar. 14, 1977

[51] Int. Cl.² ............................................. H04M 1/50
[52] U.S. Cl. .................................. 179/84 VF; 328/14
[58] Field of Search ........................ 179/84 VF, 90 K; 328/14, 27, 18; 340/347 DA; 331/48, 51

[56] References Cited

U.S. PATENT DOCUMENTS

| | | | |
|---|---|---|---|
| 3,820,028 | 6/1974 | Thomas | 179/84 VF |
| 3,959,604 | 5/1976 | Newsom | 179/84 VF |
| 3,999,049 | 12/1976 | Roche | 179/90 K |

Primary Examiner—Kathleen H. Claffy
Assistant Examiner—Joseph A. Popek
Attorney, Agent, or Firm—James B. Raden; Marvin M. Chaban

[57] ABSTRACT

A circuit for producing sinusoidal wave-forms representative of signals used in voiceband signaling for telephone dialing, frequently referred to as DTMF signaling. A sine wave is broken into a predetermined number of time increments. The amplitude changes for each increment may be indicated in the form of a binary digital word for a quadrant of the curve. The remaining quadrants will exhibit essentially the same change characteristics at like time increments with only the bit order reversed or the polarity changed thus, the basic binary word is unchanged for each quadrant. A programmable memory is set to produce the binary word at a selected clock rate. In this way, synthesis of a plurality of sine waves may be readily produced using delta modulation techniques. Ffor all sine curves, the number of time increments remains the same, the rate of pulsing the increments is varied responsive to the keyboard signals generated. For telephone use, a high and a low signal are synthesized at essentially the same time. These signals may further be combined on a single output for transmission to the tone receiver.

10 Claims, 4 Drawing Figures

MULTI-FREQUENCY GENERATOR USING DIGITAL TECHNIQUE

BACKGROUND OF THE INVENTION

Conventional multifrequency generators as used in telecommunications are well-known as shown in many publications including U.S. Pat. No. 2,824,173 L. Meacham (Feb. 18, 1958).

In this and subsequent circuits, two of a plurality of resonant circuits were coupled to the outgoing line in response to depression of a push button at the calling instrument.

More recently, a number of patents have shown circuits eliminating the need for resonant circuits. A typical one of these is U.S. Pat. No. 3,941,942 to H. Nash issued Mar. 2, 1976. In this circuit the output of a basic clock frequency is converted to two series of pulses on depression of a button, the two tones being synthesized resistively for transmission.

Another approach is shown in U.S. Pat. No. 3,787,836 to Hagelbarger issued Jan. 22, 1974. In that patent, a single base frequency is produced and fed to two dividers operating in response to operation of the keyboard to clock predetermined sequences of digital signals which are phase shifted in predetermined phase amounts.

SUMMARY OF THE INVENTION

The present invention is directed to an improved multifrequency generator for use in deriving coded tone signals (DTMF) for telecommunications signaling.

In the present invention, a base frequency is derived from an oscillator and fed to a high frequency path and a low frequency path. Responsive to the depression of a selected key at the key block or keyboard, a variable modulo (VM) divider circuit on each path is activated to produce a series of pulses based on the selected frequency rate to be transmitted. A second counter (÷32) is cycled four times to provide a division by 128. A ROM array for each path has been programmed to emit a series of ones and zeros in the programmed pattern responsive to the 32 pulses of a counter cycle. These ones and zeros define a digital word, the word representing one quadrant of a sine wave. The digital word when modulated in delta modulation will produce the sine wave. At the end of the 32 pulses, the same word is read backward with its polarity changed as the second quadrant of a sine wave, the curve in this quadrant being the mirror image of the first quadrant. The same word is read a third time with its polarity changed from that of the first quadrant word to produce the third quadrant. The fourth quadrant is a mirrow image of the third quadrant read backward, i.e. polarity change from quadrant #2 word and is emitted during the fourth cycle of the counter.

In this way, one ROM memory storing one word comprised of 32 bits may be read at a plurality of selectable rates as determined by a basic frequency clock to produce a quadrant of a sine wave at the selected rate. The remaining three quadrants of the wave may be reconstructed from the same ROM word either read backward, with the polarity changed or both.

Further since the majority of bits in the word are ones, a logic circuit may be configured in which binary ones are normally sent. Only at selected points in the count are zeros sent. It has been found that out of 32 intervals per quadrant, only five to nine bits are zeros.

Thus by eliminating the need for a full 32 bit capacity for the memory, only memory capability for the few (five to nine) change bits need be provided.

At the output of the transmitter, the two frequencies of the DTMF output may be summed and transmitted on the common signaling conductor for separation at the receiver.

It is therfore an object of the invention to provide a new and improved DTMF transmitter using digital techniques.

It is a further object of the invention to provide a dual tone, multifrequency transmitter employing counters and a ROM memory to produce the output tones derived from a single base frequency.

It is a still further object of the invention to employ a programmable ROM memory pulsed digitally to porduce a word which can be modulated into a quadrant of a sine wave, and the same word repeated in a reverse order for the next quadrant of the sine wave.

It is a still further object of the invention to provide a memory bearing a common word usable to develop all four quadrants of a sine wave, the frequency of the sine wave being dependent on the rate at which the word is read and fed to a modulator for reconstruction of the sine wave.

These and other objects, features and advantages of the invention will become apparent from the accompanying description viewed in conjunction with the drawings as now described briefly.

DETAILED DESCRIPTION OF THE DRAWINGS

Figure 1:
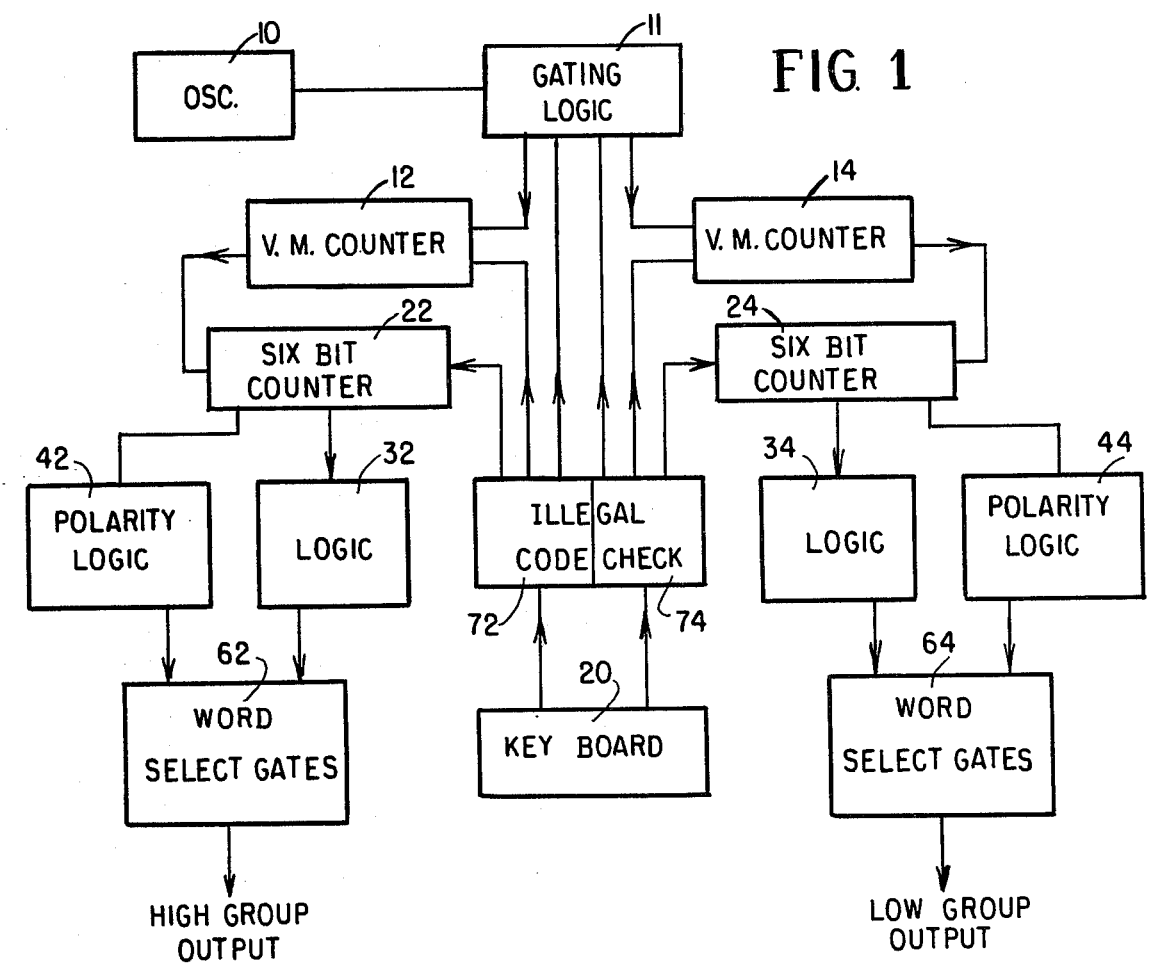
FIG. 1 is a schematic block diagram of a transmitter circuit employing my invention.

In the block diagram of FIG. 1, there is shown the basic oscillator 10. This oscillator may be of any desired frequency, a preferred one being a crystal oscillator of a commercially available type having a base frequency of 3.579545 MHZ. An oscillator of this type and frequency is a popular one in television sets for chroma control, and is readily available. The output of the oscillator is fed through gating 11 to both paths, the high frequency path through counter 12 and the low frequency counter 14. Both paths are essentially identical (FIG. 2; FIG. 3).

The counters are variable modulo counters, which act to divide the received frequency dependent on the selection received from the manually selectable keyboard 20. Using the crystal oscillator of the example, the low frequency divider 14 has selectable divisions of 30, 33, 36 and 40 of the base frequency to produce output frequencies of 941, 852, 770 and 697 HZ as conventional in telephone use. The high counter has divisions of 17, 19, 21 and 23 in the exemplary form shown to produce output frequencies of 1633, 1477, 1336 and 1209 HZ.

In response to depression of a button on keyboard 20, one counter section of the high group path is activated and one of the low group through gating, the selection combination code being designed to produce a conventional pair of signals, one from each group. The output frequencies from each button are standardized to be acceptable by Bell system equipment, as is wellknown.

The respective six bit, reversible counters 22 and 24 are pulsed at the output rate of the selected section of counters 12 and 14 to produce respective four 32 bit signals on each path. The counters 22 and 24 automatically reverse and count down following the completion of the first 32 count. The respective programmable logic arrays 32 and 34 produce the pattern of zeros and ones dependent on their respective programmable connections.

As mentioned, the counters 22 and 24 automatically reverse at the end of the 32 count, so that they count down in a second count of 32 reversing the sequence of ones and zeros of the first 32 count. The first count of the six bit counters 22 and 24 provides the first quadrant of the respective sine waves, and the count down provides the respective second quadrants as the mirror images of the first quadrants.

The polarity logic 42 and 44 change the polarity of the output signals for the second and third quadrants of the sine curve being approximated or synthesized. These quadrants are formed by a reverse and forward count through the six bit counters 22 and 24, the shape of the sine curve in the third quadrant being identical to that of the first quadrant but opposite in polarity. The countdown of the counting of counters 22 and 24 at the normal polarity constitute the fourth quadrant of the respective sine curves.

The outputs of the respective logic arrays 32 and 34 at the respective polarities as determined by polarity logic 42 and 44 respectively are fed to respective word select gates 62 and 64 as outputs to the respective high and low paths. These logic arrays may be constituted of circuits using CMOS devices.

In addition, for each path there is illegal code check logic 72 and 74, to prevent more than one button being depressed at a time and to detect improper coded inputs from the keyboard 20.

Figure 2:
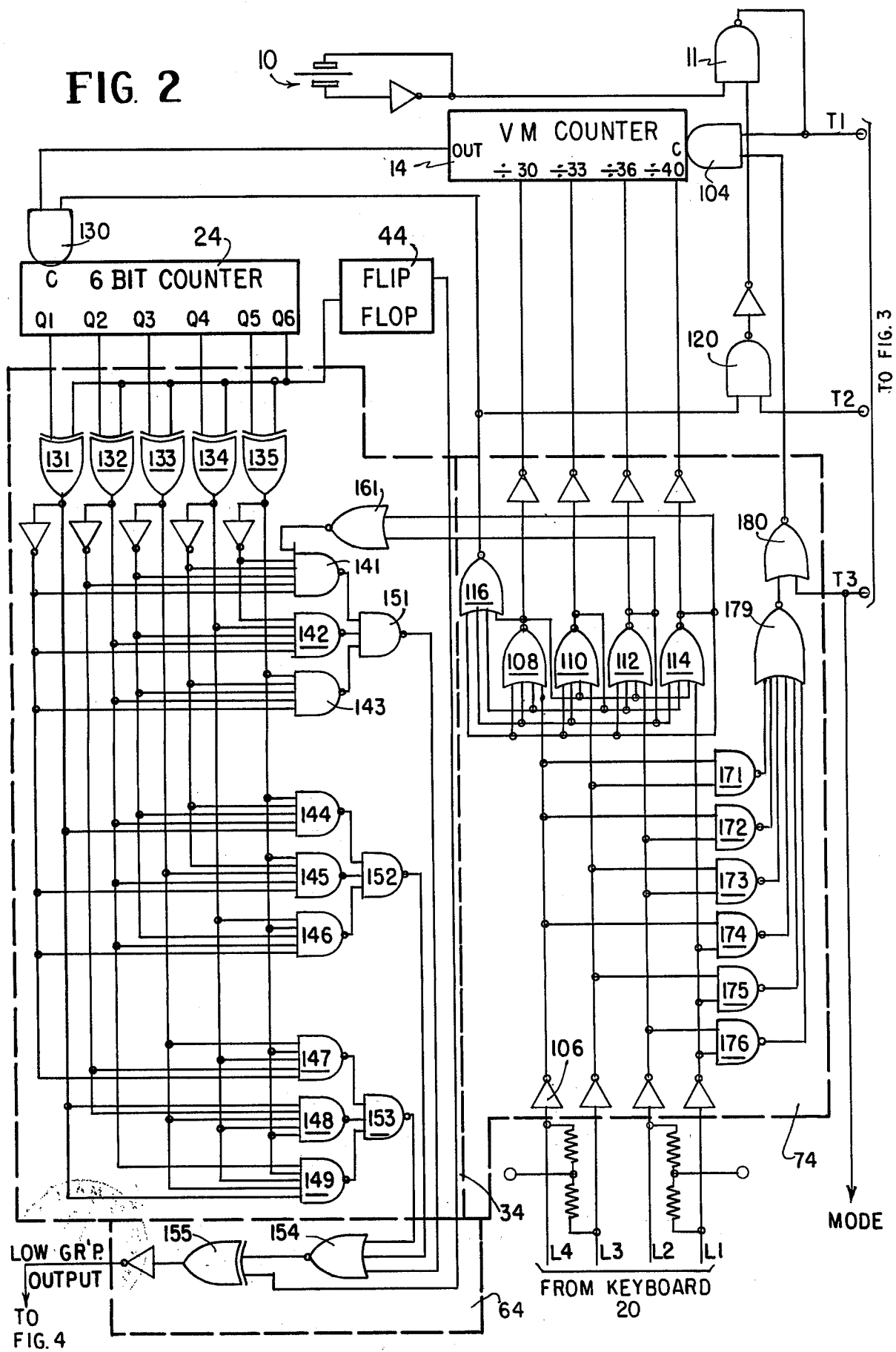
FIGS. 2 and 3 show a detailed circuit of the block diagram of FIG. 1, with FIG. 2 placed to the left of FIG. 3.
Figure 3:
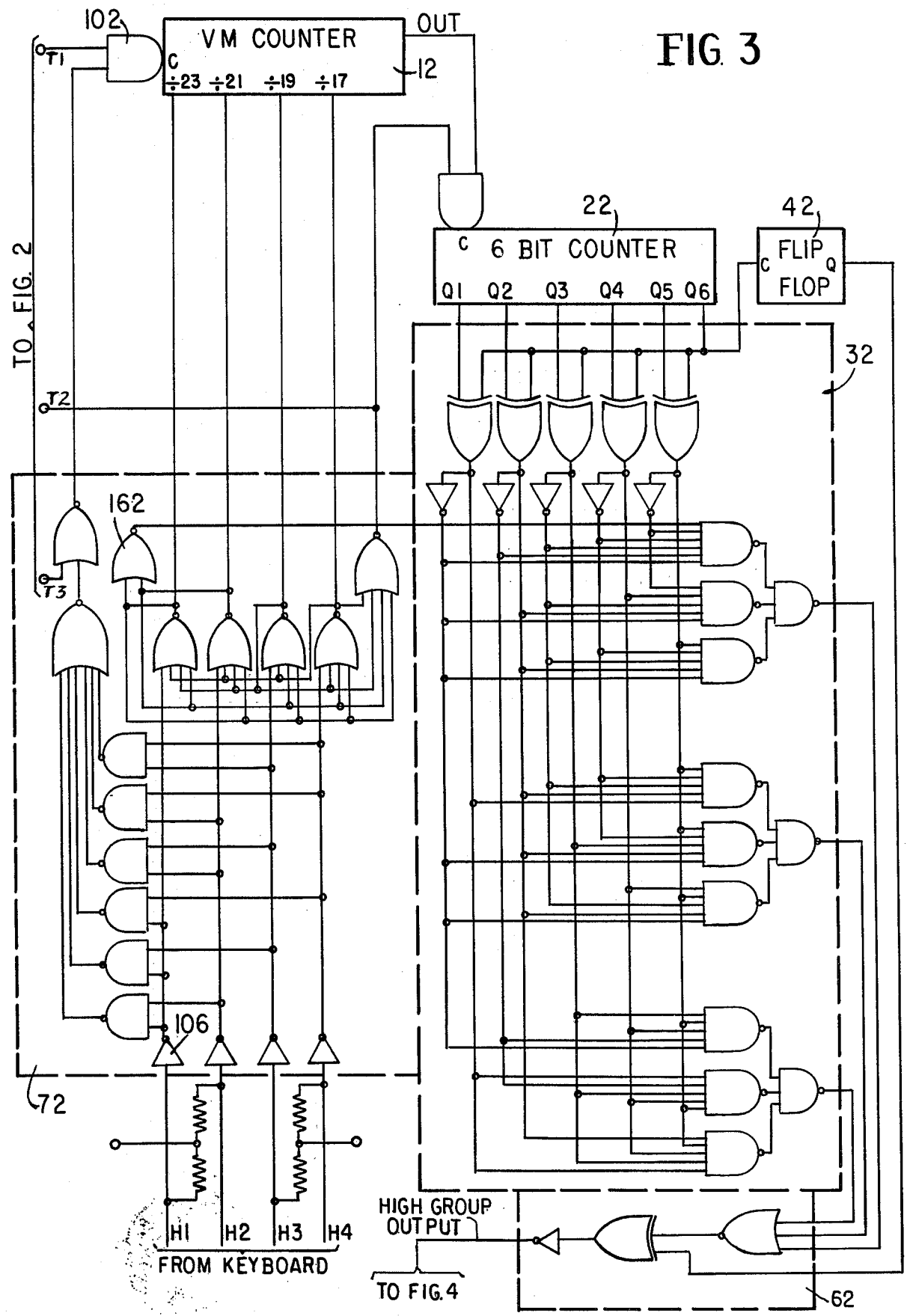

Turning to FIGS. 2 and 3, I show the circuit of my invention in greater detail. In FIG. 2, there is the crystal oscillator 10 which feeds one input of the NAND gate 11. The other input of NAND gate 11 is from the output of the single button sensing circuit or illegal code check circuit 74 which will be described in greater detail later. Gate 11 provides an output when one and only one button has been depressed and two coded leads have been activated by that button depression.

As mentioned previously, the apparatus for producing the low signal (FIG. 2) is essentially identical to that for the high signal (FIG. 3) thus only one need be described in detail. The output of gate 11 is fed to the NAND gates 102 and 104 at the inputs to the two VM (variable modulo) counter, 12 for the high group and 14 for the low group. The other input to the NAND gates 102 and 104 is connected to an output of the illegal code check 72, 74 to ensure that one button and the common switch have been depressed on the keyboard.

The keyboard 20 may be any conventional keyboard in which depression of one button results in one lead of the leads L1 - L4 being activated in the low group and one lead of the group H1 - H4 being activated in the high group. A common switch is also operated by the button depression in a conventional manner.

The signal generated by the depression for example, of the button controlling lead L4 passes through inverter 106 to NAND gate 108. The inputs to this gate are normally in a high condition.

When a high on a keyboard lead such as L4 reaches the NAND gate 108, the gate transmits the signal in inverted form to the selected section of the VM counter 14. The selected section (Divide by 30 — Lead L4) is activated to emit signals at the base frequency divided by 30. An output low from gate 108 inactivates the remaining three gates 110, 112 and 114 from leads L3, L2 and L1 respectively.

An output is also fed to the common NOR gate 116 signifying that a button had been depressed. Gate 116 provides one illegal code check acting through gate 120 to gate 11 and also to gate 130 at the input to six bit counter gate 130. In this way, counters 12 and 22 are activated by the depressed button to produce digital pulses to the programmed logic array 32.

The counters 22 and 24 are reversible six bit counters which count up to 32 using output bits Q1 - Q5. The sixth bit Q6 is a reversing output to start an automatic count down through outputs Q5 - Q1. The output leads Q1 - Q5 of counters 22 and 24 are address leads which pass through the Exclusive OR gates 131 - 135 to address NAND gates. The connections between the outputs of gates 131 - 135 may be programmed to provide any desired combination of ones and zeros. With nine gates 141 - 149, the output combination will include twenty-three or more ones and up to nine zeros in the count, the dispersing or pattern of the zeros being dependent on the connections between the outputs of gates 131 - 135 and the inputs of the NAND gates 141 - 149.

The outputs provided from 141 - 149 pass to NAND gates 151 - 153 NOR gates 154 and exclusive OR gates 155.

At the end of a 32 bit count, the flip flop 44 is set to reverse the polarity of the output for a 64 bit count, 32 down and 32 up, the flip flop 44 then changes state for a final down count of 32 bits. In this way the four quadrants of a sine wave are digitally approximated for feeding of the output of ones and zeros to a delta molulator for reconstruction of a sine wave. The sine wave is broken into 128 increments with each quadrant having 32 increments. The first quadrant is reconstructed by the first count up of counter 22 or 24. The second quadrant is a mirror image of the first quadrant formed by the first count down using the patterns of the first quadrant reversed.

Since the third quadrant profile is identical to that of the first quadrant but opposite in sign, this quadrant may be approximated by the second count up with the polarity reversed. The fourth quadrant is a mirror image of the third quadrant.

Thus, a sine wave digital approximation may be produced with a memory of minimal capacity. By employing the present principle to any recurring wave form, an array having up to 16 gates in a 32 increment system could be used replacing gates 141 - 149 to provide any form of curve using binary bit "ones" as the standard signal sent in the absence of a "zero" to be sent by a gated array. Thus, the principle shown could be used to reconstruct any recurring wave form, and not just the sine wave as shown in detail herein.

In the showing of FIG. 2, the sine curves generated by the first two positions ($\div 30$ and $\div 33$) will differ from those generated for either of the other two counter positions ($\div 36$ and $\div 40$). This pattern or word changes one zero in the transmitted word. This change is implemented by the two input OR gate 161 the gate being responsive to signal generated by depression of the button on leads L1 or L2.

In the high frequency group (FIG. 3) the first and second positions (÷23, ÷21) responsive to the depression of either button on leads H1 and H2 modify the word which would be sent responsive to the depression of either of the other two leads.

A number of safeguards have been built into the system. For example, the previously mentioned gate 120 ensures that both a high and a low signal are received in order to activate a gate 11 and initiate the operation of the counters. In the absence of both a high and a low signal the counters are not activated and no output results.

In addition, gates 171 – 176 monitor the codes sent by the buttons of leads L1 – L4. These gates (and like gates on the high group of FIG. 3) ensure that only one lead of a group is activated by a button depression, called an illegal code. The two input NAND gates 171 – 176 provide an indication on the indicated output leads when two leads of the same group are signaled. Gate 179 passes an output signal through gate 180 to shut down the counter when the button producing the two incorrect signals is released.

Figure 4:
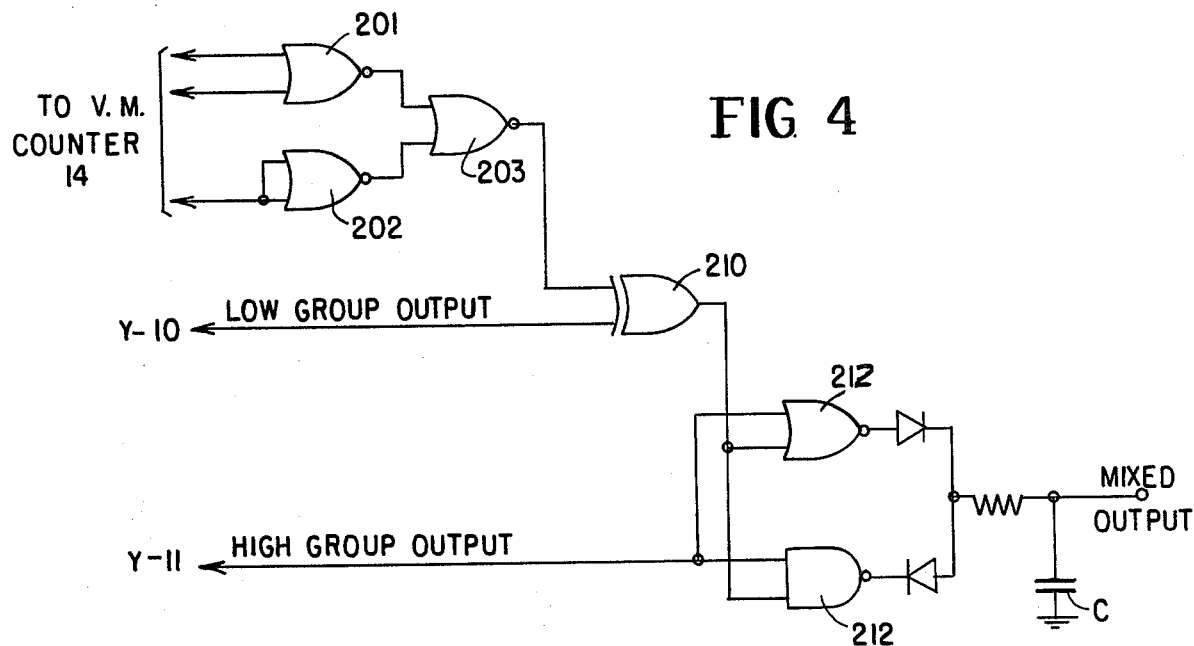
FIG. 4 is a simplified circuit which could be applied to the outputs of FIGS. 2 and 3.

In FIG. 4, I show apparatus for combining and mixing signals from the low group output lead and from the high group input lead and integrating the mixed pulses on a single output lead. The mixing is accomplished by chopping up the signal from the lower group. The pulses of the lower group are serrated to a lower time duration (37 ½% duty cycle). This duty cycle is created by the use of NOR gates 201 – 203 pulsing one input of the exclusive OR gate 210, the other input of which receives the signal from the low group.

The incidence of two zeros in the count causes the charging of capacitor C through the negative NAND gate 212. The incidence of two ones discharges capacitor C. In this way, the pulses are integrated for transmission on the mixed output lead.

By using the approach disclosed, I use a different clocked note for each sine wave formed, each wave form being divided into 128 intervals, 32 per quadrant, with the four quadrant wave forms having identical or essentially identical words representing each. In this way using a minimum of equipment and memory, I produce a sine wave for each of the frequencies used for DTMF signaling in telephone systems.

I claim:

1. A telephone signaling circuit for generating an output tone frequency in response to selection of one of a plurality of signal controllers with each controller representing at least one tone frequency, said circuit including a base frequency generator, a variable modulo counter circuit for dividing the base frequency generated by a selected modulus responsive to the controller selected for emitting pulse signals, a further counter serially disposed to receive said pulse signals, said further counter operative to divide the frequency of received pulses by a predetermined number for emitting a stream of pulses at a rate determined by said base frequency and said predetermined number, a programmable logic array for coding said pulses at said rate into a programmed digital binary word, said word being comprised of binary digital bits of either of two types to approximate the changes in the sine curve of a tone signal being generated, said array normally biased to transmit one type of bit responsive to each successive pulse of said stream and transmitting the other type at predetermined locations in said word, responsive to a stored pattern within said array.

2. A signaling circuit as claimed in claim 1, in which the curve of said tone signal comprises a sine wave having four quadrants, with said further counter being bidirectional to cycle for each quadrant of said curve.

3. A signaling circuit as claimed in claim 1, in which said further counter is reversible to produce a digital word on the reverse cycle which is a mirror image of the word produced on the forward cycle.

4. A dual tone multi-frequency generator for telephone usage comprising a multiple button keyboard wherein operation of any selected button generates a first digital word representing a high frequency tone and a second digital word representing a low frequency tone, a basic frequency clock generative of pulses at a clock frequency rate to a high frequency tone path and a low frequency tone path, a variable modulo divider in each path for dividing the clock frequency rate at respective selected high and low rates responsive to paired signals from the operated button for transmission along the respective paths, a fixed-count reversible divider in each path for emitting stream of pulses to each path based on selected high and low rates divided by said fixed count in each path, a programmable logic array in each path pulsed by the respective stream of pulses to produce binary digital words in delta modulation representing changes in an approximated sine wave at the respective high and low frequency tones, and in which each said fixed-count divider produces binary signals representing one quadrant of a sine wave in traverse thereof, and each said counter automatically reverses at the end of the fixed count to produce a second quadrant of the sine wave during a reverse transverse of said counter.

5. A generator as claimed in claim 4, in which each said logic array comprises a plurality of gates with input connections to said gates being programmable to produce a bit stream for digital synthesis of a high frequency and a low frequency sine wave at the respective high and low frequency rate.

6. A generator as claimed in claim 4, wherein each said fixed count divider comprises a binary digital counter.

7. A generator as claimed in claim 6, wherein there is means responsive to the absence of one of said paired signals from an operated button for preventing high frequency pulses from reaching said high and said low paths.

8. A generator as claimed in claim 7, wherein each said logic array also includes means responsive to an improper one of said paired signals from an operated button for inactivating the variable modulo counter for both paths.

9. A device for digitally creating a signal of a predetermined frequency from a high group of frequencies and a singal of predetermined frequency from a low group of frequencies, responsive to operation of a selected manual input member of a plurality of input members, said device comprising means for developing a base frequency signal at a rate greater than any of said high frequency signals, a plurality of frequency dividers for said low group and a second plurality of frequency dividers for said high group, with each of said dividers activatable to divide said base signal frequency by a different count, means for activating a divider for said high group and a divider for said low group responsive to the selective operation of one member to produce a high group signal and a low group signal, means for counting recurrences of the high group signal and the low group signal by the same fixed count to produce a plurality of pulsed signals at a low rate and at a high rate, a first logic array for signals of said low rate and a second logic array for signals of said high rate, said logic array responsive to said pulsed signals at said high rate and said low rate for revising a programmed binary digital word determinative of changes in amplitude of a sine wave at said high rate and at said low rate for delta modulating a sine curve for the high group and for the low group.

10. A device as claimed in claim 9, in which the count of each of said further counting means comprises a plurality of time intervals in a sine wave to produce four digital words during the intervals defining a sine wave with said words comprising essentially the same combination of binary bits, the bits of the second and fourth words being reversed from the first and third words, and in which there are means for reversing the polarity of the bits comprising said second and third words from said first and fourth words.

* * * * *